United States Patent
Marupaduga et al.

(10) Patent No.: US 9,137,827 B1
(45) Date of Patent: Sep. 15, 2015

(54) DYNAMIC ADJUSTMENT OF PREAMBLES FOR A RANDOM ACCESS CHANNEL

(71) Applicant: Sprint Communications Company L.P., Overland Park, KS (US)

(72) Inventors: Sreekar Marupaduga, Overland Park, KS (US); Nicholas David Kullman, Kansas City, MO (US); Andrew Mark Wurtenberger, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 158 days.

(21) Appl. No.: 13/946,725

(22) Filed: Jul. 19, 2013

(51) Int. Cl.
*H04W 36/32* (2009.01)
*H04W 36/28* (2009.01)
*H04W 36/24* (2009.01)
*H04W 72/04* (2009.01)
*H04W 74/08* (2009.01)
*H04W 74/06* (2009.01)

(52) U.S. Cl.
CPC .......... *H04W 74/0833* (2013.01); *H04W 74/06* (2013.01)

(58) Field of Classification Search
CPC . H04W 28/00; H04W 24/02; H04W 36/0005; H04W 36/32; H04W 28/26; H04W 74/08; H04W 74/04
See application file for complete search history.

(56) References Cited

U.S. PATENT DOCUMENTS

| | | | | |
|---|---|---|---|---|
| 8,406,201 | B2 * | 3/2013 | Vujcic | 370/335 |
| 2008/0225785 | A1 | 9/2008 | Wang et al. | |
| 2010/0195636 | A1 * | 8/2010 | Nakashima et al. | 370/342 |
| 2011/0039568 | A1 * | 2/2011 | Zhang et al. | 455/452.1 |
| 2011/0134862 | A1 * | 6/2011 | Huang et al. | 370/329 |
| 2011/0158104 | A1 * | 6/2011 | Frenger et al. | 370/241 |
| 2011/0165874 | A1 | 7/2011 | Amirijoo et al. | |
| 2011/0207466 | A1 * | 8/2011 | Hegge | 455/450 |
| 2012/0052898 | A1 * | 3/2012 | Hegge | 455/511 |
| 2013/0265942 | A1 * | 10/2013 | Lu et al. | 370/328 |
| 2013/0286958 | A1 * | 10/2013 | Liang et al. | 370/329 |
| 2014/0036847 | A1 * | 2/2014 | Jeong et al. | 370/329 |
| 2014/0146790 | A1 * | 5/2014 | Zhang et al. | 370/331 |
| 2014/0370904 | A1 * | 12/2014 | Smith et al. | 455/450 |

* cited by examiner

*Primary Examiner* — Ahmed Elallam

(57) ABSTRACT

Embodiments disclosed herein provide systems and methods for dynamically adjusting preambles for a random access channel. In a particular embodiment, a method provides, for a wireless access node having a random access channel, determining a demand for contention based preambles of the random access channel and a demand for contention free preambles of the random access channel. The method further provides determining a number of contention based preambles and a number of contention free preambles for the random access channel based on the demand for contention based preambles and the demand for contention free preambles. The method also provides allocating the number of contention based preambles and the number of contention free preambles to the random access channel.

20 Claims, 6 Drawing Sheets

DYNAMIC ADJUSTMENT OF PREAMBLES FOR A RANDOM ACCESS CHANNEL

TECHNICAL BACKGROUND

Some wireless communication network protocols employ a random access channel for wireless communication devices to use when initiating wireless communications with a wireless access node. A wireless device attempting to initiate communications with the access node requests a communication channel over the random access channel using one of a fixed number of preambles for communications on the random access channel. Of the fixed number of preambles, a portion of the preambles is allocated as contention based preambles and the remainder of the preambles are allocated as contention free preambles.

If a wireless device is originating communications on the access node, then the wireless device uses a contention based preamble, which the device selects at random, to communicate over the random access channel. As the preamble is contention based, it is possible that another wireless device will attempt to use the same preamble to initiate communications. Thus, the access node employs a contention resolution procedure during times when multiple devices use the same preamble.

Alternatively, if the communications originated on another access node and are handing off to the access node, then the wireless device is assigned a contention free preamble that only that particular wireless device is able to use on the random access channel for communicating at that time. Contention free preambles allow a wireless device that is handing off to initiate communications with the new access node without the risk of adverse effects caused by a preamble collision.

While the number of wireless devices needing either contention based or contention free preambles may change over time, the portions of the total number of preambles on the random access channel allocated as each preamble type remains constant. Thus, at times, the demand for one type of preamble may not be satisfied by the constant preamble allocation.

OVERVIEW

Embodiments disclosed herein provide systems and methods for dynamically adjusting preambles for a random access channel. In a particular embodiment, a method provides, for a wireless access node having a random access channel, determining a demand for contention based preambles of the random access channel and a demand for contention free preambles of the random access channel. The method further provides determining a number of contention based preambles and a number of contention free preambles for the random access channel based on the demand for contention based preambles and the demand for contention free preambles. The method also provides allocating the number of contention based preambles and the number of contention free preambles to the random access channel.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
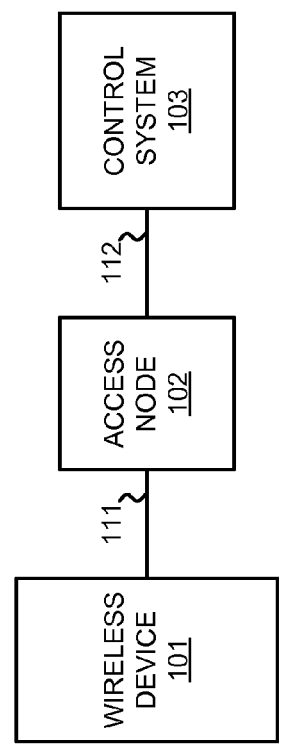
FIG. 1 illustrates a wireless communication system for dynamically adjusting preambles for a random access channel.

FIG. 1 illustrates wireless communication system 100. Wireless communication system 100 includes wireless communication device 101, wireless access node 102, and communication control system 103. Wireless communication device 101 and wireless access node 102 communicate over wireless link 111. Wireless access node 102 and communication control system 103 communicate over communication link 112.

In operation, wireless access node 102 and control system 104 are part of a wireless communication network that provides communication services to wireless communication devices, such as wireless device 101. While not shown, the wireless communication network may also include other access nodes and systems for providing the communication services. Access node 102 exchanges communications with wireless devices using a wireless protocol, such as Long Term Evolution (LTE), that uses a random access channel.

The random access channel is a shared channel (i.e. used, or capable of being used, by multiple wireless devices concurrently) that is used by wireless devices to initiate communications with access node 102. The random access channel has a fixed number of preambles that can each be used by a respective wireless device. A number of these preambles are contention free preambles that are assigned for use by a single wireless device at any given time. In contrast, a number of the preambles are contention based preambles that can be used by any wireless device. If more than one device uses a single one of the contention based preambles concurrently, then access node 102 implements a procedure to resolve the contention of the multiple devices.

Contention free preambles are typically assigned to wireless devices that hand off from another access node to access node 102 while exchanging wireless communications. A contention free preamble aids the handover process by allowing the wireless device to initiate communications with access node 102 over the random access channel using the contention free preamble without the risk of a collision with another device using the same preamble. Contention based preambles are used by wireless devices not already exchanging communications with the wireless network. A device randomly selects one of the contention based preambles (since a specific preamble cannot be assigned to the device by virtue of the device not yet exchanging communications with the network) and uses that preamble in an attempt to establish communications with access node 102 over the random access channel.

The number of contention free and the number of contention based preambles out of the total number of available preambles are static. Therefore, if a number of wireless devices handing off to access node 102 is, or will be, greater than the number of contention free preambles available, then the number of contention free preambles is not increased to help accommodate the larger number of handing off devices. In a similar example, if a number of wireless devices attempting to initiate communications with access node 102 is, or will be, greater the number of contention based preambles, then the number of contention based preambles is not increased to help alleviate collisions on the existing contention based preambles.

Figure 2:
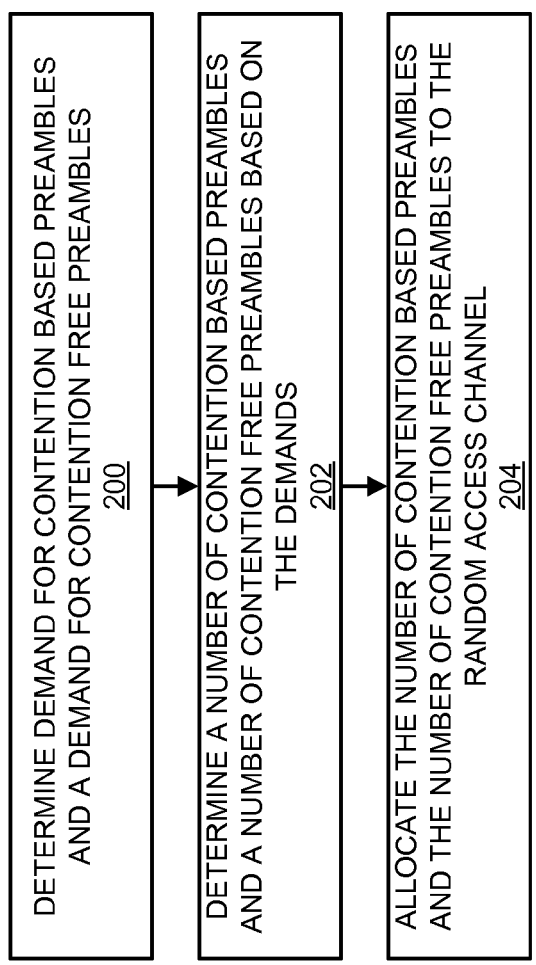
FIG. 2 illustrates an operation of the wireless communication system for dynamically adjusting preambles for a random access channel.

FIG. 2 illustrates an operation of wireless communication system 100 to dynamically adjust preambles on a random access channel. For wireless access node 101 having a random access channel, control system 103 determines a demand for contention based preambles of the random access channel and a demand for contention free preambles of the random access channel (step 200). The demand for contention based and contention free preambles may be based on current activity of wireless devices or based on anticipated activity.

The demand for contention free preambles may be determined based on a number of wireless communication devices that are, or soon will be, in the process of handing off to wireless access node 102. Each of those devices are, or soon will be, in need of a contention free preamble to initiate communications with access node 102 when handing off to access node 102 from another access node. Determining that a number of wireless devices will soon be handing off to wireless access node 102 may be based on mobility of wireless devices in access nodes neighboring access node 102. For example, as devices enter a state of mobility, the chances that the devices will need to handoff between access nodes increases because a stationary device is not likely to handoff. The mobility state of a wireless device may depend upon device speed, direction, as well as other factors.

To determine anticipated activity, control system 103 may track activity of wireless devices over time and then use that activity information to determine expected device activity for a similar time period. For example, control system 103 from tracking the number of handoffs that occur at given times, control system 103 may determine that the demand for contention free preambles increases during rush hour on weekdays as wireless device users commute to and from work. Additional factors may also contribute to a determination of anticipated activity. For example, a large event may be scheduled during a time period for an area within the coverage area of access node 102. Therefore, control system 103 may determine, based on information for the event (i.e. expected attendance), that the demand for contention based preambles will be greater due to an increased number of devices that may need to initiate communications with access node 102.

Control system 103 then determines a number of contention based preambles and a number of contention free preambles for the random access channel based on the demand for contention based preambles and the demand for contention free preambles (step 202). In some embodiments, control system 103 will balance the number contention based preambles and the number of contention free preambles within the total number of preambles available on the random access channel. The balancing between the two types of preambles may be performed in proportion to the determined demands. For example control system 103 may determine the number of each type of preamble such that the ratio of contention based preambles to contention free preambles is equivalent to the ratio of the demand for contention based preambles and the demand for contention free preambles.

In some embodiments, control system 103 increases the number of contention free preambles if the demand for contention free preambles increases and increases the number of contention based preambles if the number of contention based preambles increase. These increases may be performed regardless of the demand for the other type of preamble. Alternatively, control system 103 may consider other factors when determining the number of each type of preamble. For example, contention free preambles may be considered higher priority so that communications already in progress do not drop when handing over to access node 102. Thus, control system 103 will increase the number of contention free preambles even if increasing the number of contention free preambles would reduce the number of contention based preambles below demand.

Control system 103 then allocates the number of contention based preambles and the number of contention free preambles to the random access channel (step 204). Control system 103 may transfer a message to access node 102 instructing access node 102 to operate using determined numbers of each type of preamble. In some embodiments, control system 103 may further determine and specify to access node 102 which specific preambles of should be designated to each preamble type while, in other embodiments, access node 102 determines the specific preamble designations itself.

Other access nodes may also receive a notification so that those access node can assign contention free preambles of access node 102 to wireless devices that are handing off to access node 102. Wireless device 101 and other wireless devices within the coverage area of access node 102 may also receive messages from access node 102 indicating which preambles are now designated contention based for use when the wireless devices initiate communications with access node 102.

Referring back to FIG. 1, wireless communication device 101 comprises Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. Wireless communication device 101 may be a telephone, computer, e-book, mobile Internet appliance, wireless network interface card, media player, game console, or some other wireless communication apparatus—including combinations thereof.

Wireless access node 102 comprises RF communication circuitry and an antenna. The RF communication circuitry typically includes an amplifier, filter, RF modulator, and signal processing circuitry. Wireless access node 102 may also comprise a router, server, memory device, software, processing circuitry, cabling, power supply, network communication interface, structural support, or some other communication apparatus. Wireless access node 102 could be a base station, eNodeB, Internet access node, telephony service node, wireless data access point, or some other wireless communication system—including combinations thereof.

Communication control system 103 comprises a computer system and communication interface. Communication control system 103 may also include other components such as a router, server, data storage system, and power supply. Communication control system 103 may reside in a single device or may be distributed across multiple devices. Communication control system 103 is shown externally to wireless access node 102, but system 103 could be integrated within the components of wireless access node 102 or within some other component of a wireless communication network. Communication control system 103 could be a mobile switching center, network gateway system, Internet access node, application server, service node, or some other communication system—including combinations thereof.

Wireless link 111 uses the air or space as the transport media. Wireless link 111 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication link 112 uses metal, glass, air, space, or some other material as the transport media. Communication link 112 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication link 112 could be a direct link or may include intermediate networks, systems, or devices.

Figure 3:
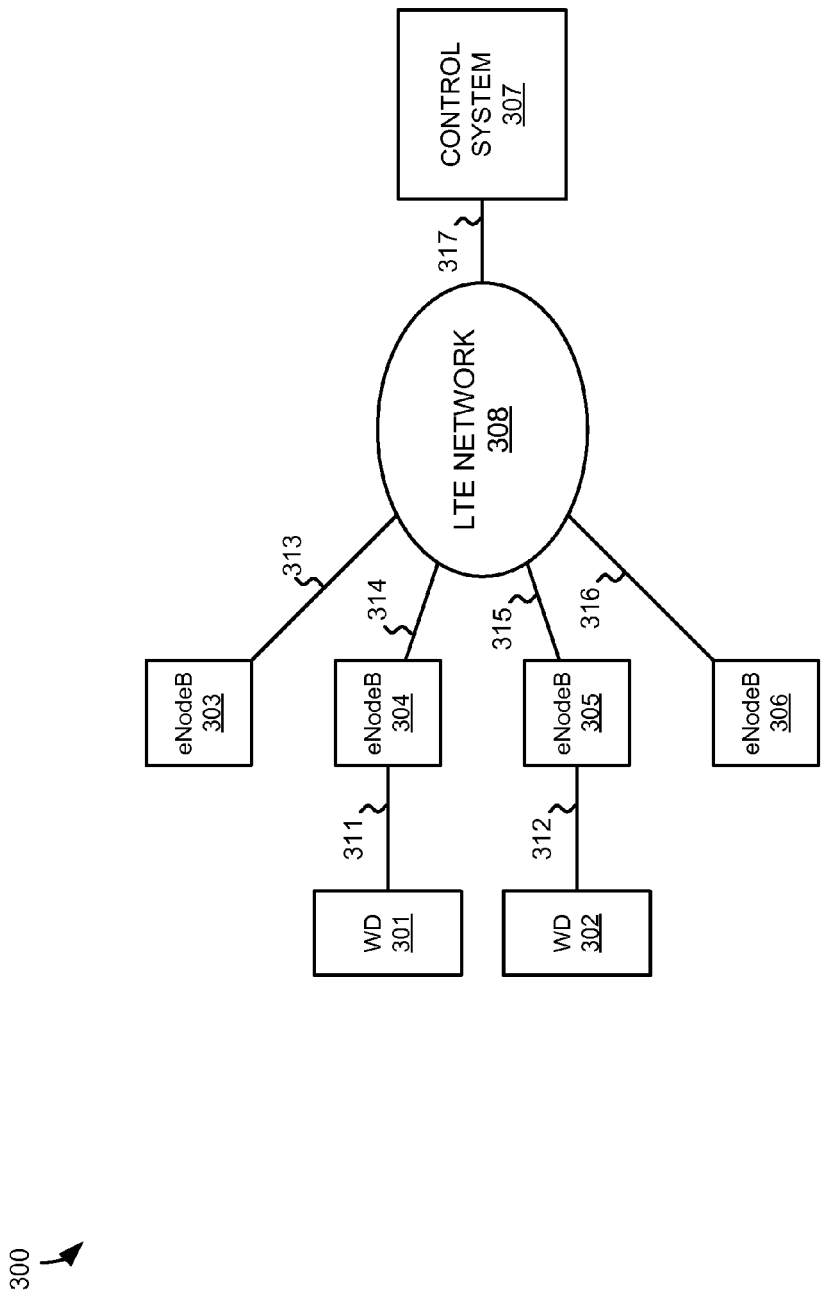
FIG. 3 illustrates a wireless communication system for dynamically adjusting preambles for a random access channel.

FIG. 3 illustrates wireless communication system 300. Wireless communication system 300 includes wireless communication devices 301 and 302, eNodeBs 303-306, communication control system 307, and LTE wireless network 308. Wireless communication device 301 and eNodeB 304 communicate over wireless link 311. Wireless communication device 302 and eNodeB 305 communicate over wireless link 312. eNodeBs 303-306 and LTE wireless network 308 communicate over communication links 313-316, respectively. LTE wireless network 308 and communication control system 307 communicate over communication link 117.

Figure 4:
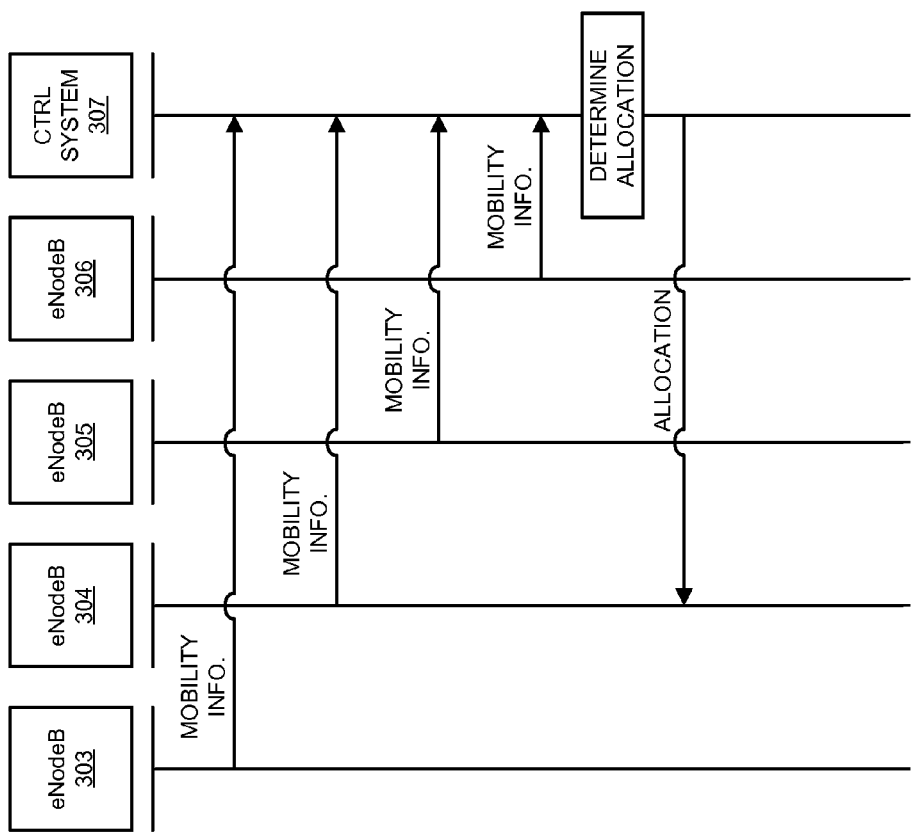
FIG. 4 is a sequence diagram illustrating an operation of the wireless communication system for dynamically adjusting preambles for a random access channel.

FIG. 4 is a sequence diagram illustrating an operation of wireless communication system 400 to dynamically adjust preambles on a random access channel. In this embodiment, control system 307 is configured to allocate contention based and contention free preambles on each respective random access channel for eNodeBs 303-306. The random access channel for each eNodeB includes 64 preambles for the purposes of this embodiment. Therefore, control system 307 allocates each of the 64 preambles to be either contention based or contention free.

In order to allocate the preambles, control system 307 receives mobility information from each of eNodeBs 303-306. The mobility information may indicate to control system 307 whether wireless devices within the coverage areas of each base station are moving, how fast the devices are moving, directions in which the devices are moving, or other information related to the movement of wireless devices—including combinations thereof. Based on the mobility information, control system 307 is able to determine whether the wireless devices are moving and where those devices are moving. Wireless devices that are not moving are more likely to need contention based preambles to initiate communications with their respective eNodeBs. Alternatively, wireless devices that are moving are more likely to require contention free preambles on the eNodeB to which they are moving so that communications exchanged with those devices can handoff to that eNodeB.

In accordance with the mobility information, control system 307 determines a preamble allocation for each of eNodeBs 303-306. For example, if the mobility information indicates that more contention free preambles are needed on eNodeB 304 than contention based preambles, then control system 307 allocates more of the 64 preambles of eNodeB 304 to be contention free preambles. Control system 304 then notifies eNodeB 304 of the determined allocation so that eNodeB 304 can implement its preambles in accordance with the allocation. In addition to notifying the other eNodeBs of their respective allocations, control system 307 may also indicate at least a portion of the allocation information for eNodeB 304 to the other eNodeBs so that the other eNodeBs can assign a contention free preamble to any wireless devices handing off to eNodeB 304.

In an example of this embodiment, wireless device 301 is within the coverage area of eNodeB 304 and is thereby notified of the preambles that are allocated as contention based preambles in accordance with control system 307. Thus, when wireless device 301 initiates a communication session with eNodeB 304, wireless device 301 selects one of the preambles allocated as contention based to perform the initiation. Additionally, wireless device 302 is currently exchanging communications in a communication session with eNodeB 305 and is moving towards handing off with eNodeB 304. Therefore, in preparation for the handoff and wireless device 302 needing to initiate communications with eNodeB 304 to continue the communication session, wireless device 302 is assigned one of the preambles allocated as contention free. Wireless device 302 then uses that contention free preamble to initiate and handoff communications for the communication session to eNodeB 304.

In operation, control system 307 may continue to adjust the preamble allocations for each of eNodeBs 303-306 in order to account for current demand for each type of preamble.

Figure 5:
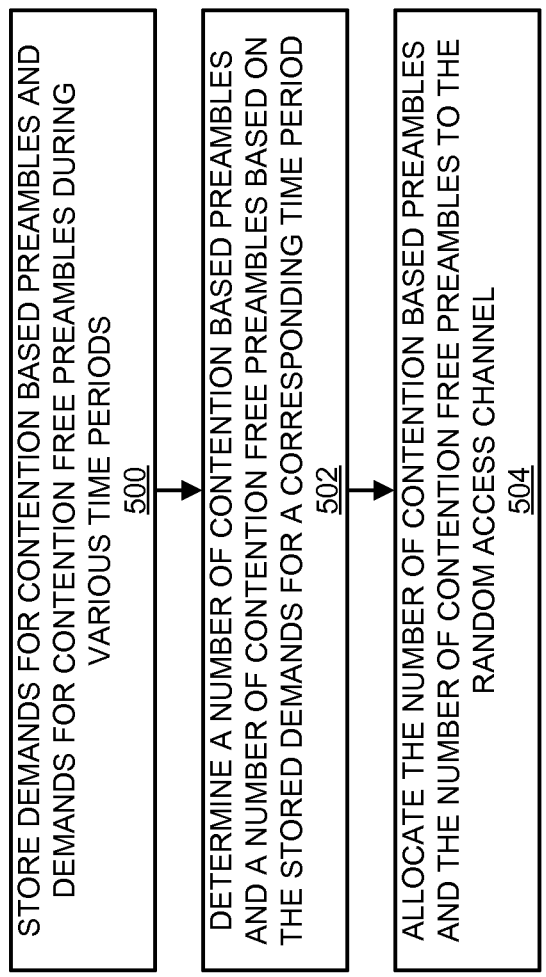
FIG. 5 illustrates an operation of the wireless communication system for dynamically adjusting preambles for a random access channel.

FIG. 5 illustrates an operation of wireless communication system 300 to dynamically adjust preambles on a random access channel based on expected demand. Over time, control system 307 receives mobility information from eNodeBs 303-306 and determines demands for contention free and contention based preambles at the time the mobility information was collected (step 500). The demands are then stored in a storage system in correlation with the time the mobility information was collected (i.e. time of day, day, week, month, etc.) for later reference. In some embodiments, the mobility information itself may be stored in addition to the demands or alternatively to the demands so that the demands can be calculated at a later time. Control system 307 may also store additional information about the time period that may be useful when determining an expected demand (e.g. events, weather conditions, etc.).

At a later time, control system 307 accesses the storage system to determine a number of contention based preambles and a number of contention free preambles based on demands stored for one or more time periods corresponding to the later time (step 502). For example, the demands around noon on a Saturday for eNodeB 304 will likely be similar to demands around noon on Saturdays in the past. However, as mentioned above, if the storage system further stores additional information related to the time in which the mobility information was captured, then control system 307 may further consider demands during times having similar aspects in the additional information. In some embodiments, control system 307 may also consider demands for non-corresponding time periods having similar additional information.

After determining the number of contention based preambles and the number of contention free preambles based on the stored demands, control system 307 allocates the respective preamble numbers to the random access channel for each of eNodeBs 303-306 (step 504). In some embodiments, control system 307 may subsequently adjust the preamble allocations to better account for actual mobility conditions experienced for wireless devices communicating with eNodeBs 303-306.

Figure 6:
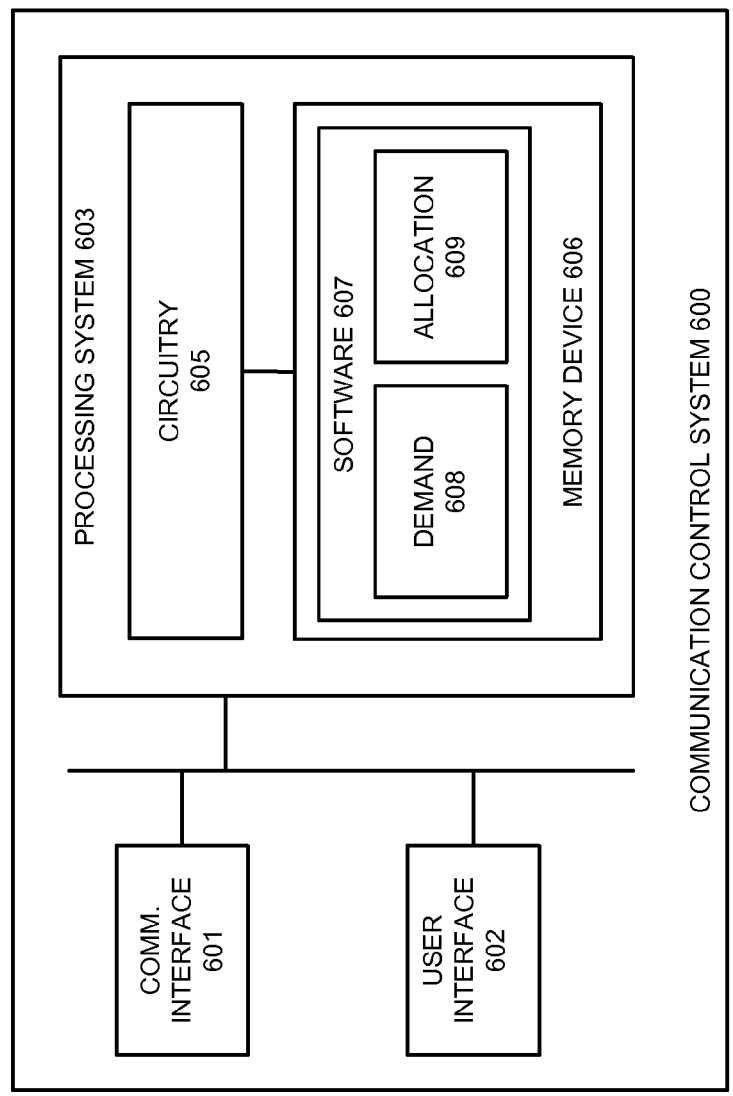
FIG. 6 illustrates a communication control system for dynamically adjusting preambles for a random access channel.

FIG. 6 illustrates communication control system 600. Communication control system 600 is an example of communication control system 103, although control system 103 may use alternative configurations. Communication control system 600 comprises communication interface 601, user interface 602, and processing system 603. Processing system 603 is linked to communication interface 601 and user interface 602. Processing system 603 includes processing circuitry 605 and memory device 606 that stores operating software 607.

Communication interface 601 comprises components that communicate over communication links, such as network cards, ports, RF transceivers, processing circuitry and software, or some other communication devices. Communication interface 601 may be configured to communicate over metallic, wireless, or optical links. Communication interface 601 may be configured to use TDM, IP, Ethernet, optical networking, wireless protocols, communication signaling, or some other communication format—including combinations thereof.

User interface 602 comprises components that interact with a user. User interface 602 may include a keyboard, display screen, mouse, touch pad, or some other user input/output apparatus. User interface 602 may be omitted in some examples.

Processing circuitry 605 comprises microprocessor and other circuitry that retrieves and executes operating software 607 from memory device 606. Memory device 606 comprises a non-transitory storage medium, such as a disk drive, flash drive, data storage circuitry, or some other memory apparatus. Operating software 607 comprises computer programs, firmware, or some other form of machine-readable processing instructions. Operating software 607 includes demand determination module 608 and allocation module 609. Operating software 607 may further include an operating system, utilities, drivers, network interfaces, applications, or some other type of software. When executed by circuitry 605, operating software 607 directs processing system 603 to operate communication control system 600 as described herein.

In particular, demand determination module 608 directs processing system 603 to, for a wireless access node having a random access channel, determine a demand for contention based preambles of the random access channel and a demand for contention free preambles of the random access channel. Allocation module 609 directs processing system 603 to determine a number of contention based preambles and a number of contention free preambles for the random access channel based on the demand for contention based preambles and the demand for contention free preambles. Allocation module 609 further directs processing system 603 to allocate the number of contention based preambles and the number of contention free preambles to the random access channel.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system, comprising:
  for a wireless access node having a random access channel, receiving mobility information for wireless communication devices from a plurality of neighboring wireless access nodes;
  determining a number of contention free preambles for the random access channel based on a demand for contention free preambles based on the mobility information; and
  allocating the number of contention free preambles to the random access channel.

2. The method of claim 1 further comprising:
  determining a number of contention based preambles for the random access channel based on a number of wireless communication devices initiating access to a traffic channel on the wireless access node.

3. The method of claim 2, wherein determining the number of contention based preambles and the number of contention free preambles for the random access channel based on the demand for contention free preambles comprises:
  increasing the number of contention based preambles if the number of wireless communication devices initiating access to a traffic channel exceeds a threshold number of devices.

4. The method of claim 1, wherein determining the demand for contention free preambles based on the mobility information further comprises:
  determining a number of wireless communication devices handing off to the wireless access node from a plurality of other wireless access nodes.

5. The method of claim 4, wherein determining the number of contention free preambles for the random access channel based on the demand for contention free preambles comprises:
  increasing the number of contention free preambles if the number of wireless communication devices handing off to the wireless access node exceeds a threshold number of devices.

6. The method of claim 1, wherein
  the received mobility information indicates how fast the wireless communication devices are moving.

7. The method of claim 6, wherein determining the number of contention free preambles for the random access channel based on the demand for contention free preambles comprises:
  increasing the number of contention free preambles if a number of wireless communication devices entering a mobile state exceeds a threshold number of devices.

8. The method of claim 6, wherein:
  the mobility information further indicates directions in which the wireless communication devices are moving.

9. The method of claim 1, wherein determining the number of contention free preambles for the random access channel based on the demand for contention free preambles comprises:
  determining a number of contention based preambles and the number of contention free preambles such that a ratio of the number of contention based preambles to the number of contention free preambles is proportional to a ratio of a demand for contention based preambles to the demand for contention free preambles.

10. The method of claim 1, wherein:
the demand for contention free preambles based on the mobility information further comprises a predicted demand for contention free preambles that is based upon historical demand for contention free preambles.

11. A wireless communication system, comprising a processing system configured to:
for a wireless access node having a random access channel, receive mobility information for wireless communication devices from a plurality of neighboring wireless access nodes;
determine a number of contention free preambles for the random access channel based on a demand for contention free preambles based on the mobility information; and
allocate the number of contention free preambles to the random access channel.

12. The wireless communication system of claim 11 the processing system is configured to:
determine a number of contention based preambles for the random access channel based on a number of wireless communication devices initiating access to a traffic channel on the wireless access node.

13. The wireless communication system of claim 12, wherein to determine the number of contention based preambles and the number of contention free preambles for the random access channel based on the demand for contention free preambles, the processing system is configured to:
increase the number of contention based preambles if the number of wireless communication devices initiating access to a traffic channel exceeds a threshold number of devices.

14. The wireless communication system of claim 11, wherein to determine the demand for contention free preambles based on the mobility information, the processing system is configured to:
determine a number of wireless communication devices handing off to the wireless access node from a plurality of other wireless access nodes.

15. The wireless communication system of claim 14, wherein to determine the number of contention free preambles for the random access channel based on the demand for contention free preambles the processing system is configured to:
increase the number of contention free preambles if the number of wireless communication devices handing off to the wireless access node exceeds a threshold number of devices.

16. The wireless communication system of claim 11, wherein
the received mobility information indicates how fast the wireless communication devices are moving.

17. The wireless communication system of claim 16, wherein to determine the number of contention free preambles for the random access channel based on the demand for contention free preambles, the processing system is configured to:
increase the number of contention free preambles if a number of wireless communication devices entering a mobile state exceeds a threshold number of devices.

18. The wireless communication system of claim 16,
the mobility information further indicates directions in which the wireless communication devices are moving.

19. The wireless communication system of claim 11, wherein to determine the number of contention free preambles for the random access channel based on the demand for contention free preambles, the processing system is configured to:
determine a number of contention based preambles and the number of contention free preambles such that a ratio of the number of contention based preambles to the number of contention free preambles is proportional to a ratio of a demand for contention based preambles to the demand for contention free preambles.

20. The wireless communication system of claim 11, wherein:
the demand for contention free preambles based on the mobility information further comprises a predicted demand for contention free preambles that is based upon historical demand for contention free preambles.

* * * * *